3,465,961
TEMPERATURE CONTROL APPARATUS
Lyle E. McBride, Jr., Norton, Mass., assignor to Texas Instruments Incorporated, Dallas, Tex., a corporation of Delaware
Filed July 14, 1967, Ser. No. 653,428
Int. Cl. F23n 5/02; G05d 23/24, 23/30
U.S. Cl. 236—9                                  9 Claims

ABSTRACT OF THE DISCLOSURE

The apparatus disclosed herein controls the operation of a gas-fired, forced hot air furnace to maintain the temperature in a given zone at a preselected level. The flow of gas to the furnace burner is turned on and off under the control of a first temperature sensing thermistor which is located in the plenum of the furnace. The temperature in the zone being controlled is sensed by a second thermistor. This second thermistor controls means for applying a biasing heat flow to the thermistor in the plenum to vary the duty cycle or proportion of time during which the burner is on and thereby maintain the temperature in the given zone at the preselected level.

---

Figure 1:
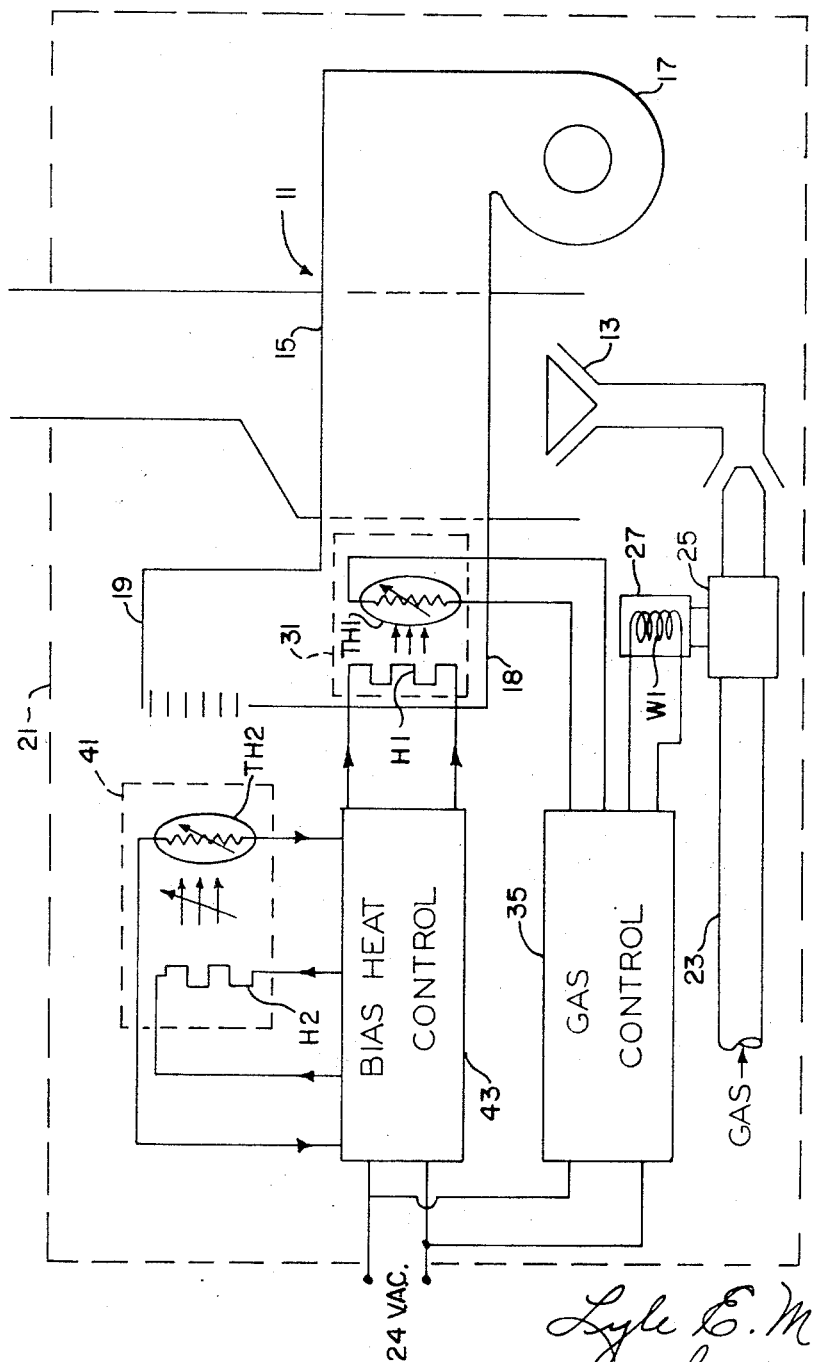

This invention relates to temperature control apparatus and more particularly to such apparatus which will maintain the temperature in a given zone at a preselected level.

In typical known residential heating systems, the generation of heat is controlled in an on-off mode by a thermostat which responds to the temperature in a central location in the dwelling. Such thermostats typically provide a differential or so-called deadband between the temperature at which the furnace is turned on and that at which it is turned off. Such a differential is usually necessary to provide stability and prevent hunting or "chattering" of the control. Due to this differential and to the delay between the time at which the furnace is energized and the time at which heat produced by that energization reaches the thermostat, such systems operate in a mode which produces a continual hunting of the actual temperature around the desired set point, the separation between the high and the low temperatures being in the order of several degrees.

Among the several objects of the present invention may be noted the provision of apparatus for maintaining the temperature in a given zone quite precisely at a preselected level without substantial deviations around that level; the provision of such apparatus which provides proportional control of the heat flow which is provided to the given zone when the zone is at a particular temperature; the provision of such a system which permits on-off control of a burner or other heat flow varying means; the provision of such apparatus which is highly reliable; and the provision of such apparatus which is relatively simple and inexpensive. Other objects and features will be in part apparent and in part pointed out hereinafter.

Briefly, apparatus according to this invention is operative to maintain the temperature in a given zone at a preselected level. The apparatus includes means which, when energized, varies a first temperature which affects heat flow relative to the zone. A first temperature sensing means responds to this first temperature and causes the temperature varying means to be energized when the temperature of the first sensing means passes a predetermined threshold. Thus deviations in the temperature of the first sensing means around that threshold are controlled by on-off energization of the temperature varying means. The apparatus also includes second temperature sensing means for providing a signal which varies as a function of the temperature in the zone and means for providing a biasing heat flow relative to the first sensing means which biasing heat flow varies as a function of the signal provided by the second temperature sensing means. Accordingly, the temperature at which the first sensing means responds to the first temperature is shifted as a function of the amplitude of the signal to correspondingly vary the proportion of time during which the temperature varying means is energized whereby the temperature in the zone is maintained at the preselected level.

The invention accordingly comprises the constructions hereinafter described, the scope of the invention being indicated in the following claims.

Figure 2:
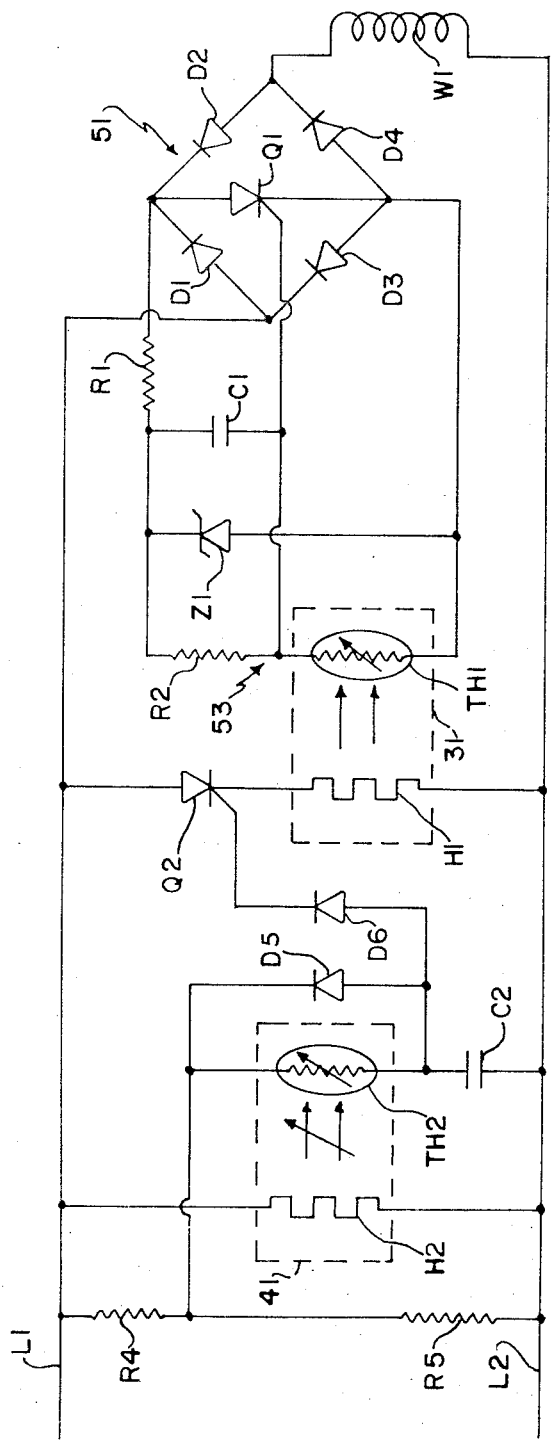

In the accompanying drawings, in which one of various possible embodiments of the invention is illustrated, FIG. 1 is a diagrammatic illustration of a residential heating system provided with temperature control apparatus according to the present invention; and FIG. 2 is a schematic circuit diagram of the temperature control apparatus.

Corresponding reference characters indicate corresponding parts throughout the several views of the drawings.

Referring now to FIG. 1, there is indicated generally at 11 a gas-fired, forced hot air furnace which may, for example, comprise a conventional residential heating unit. Furnace 11 includes a gas burner 13, a heat exchanger 15 and a blower 17 for forcing air through heat exchanger 15 to pick up heat from the burner flame. The blower 17 runs continuously. After leaving the heat exchanger, the heated air passes through the furnace plenum, indicated generally at 18, and out through ductwork 19 into the zone which is to be heated. This zone is indicated generally at 21 and may, for example, comprise the interior of a residential structure. Gas is provided to burner 13 from a gas main 23 through a valve 25 which may be selectively opened by energizing a solenoid indicated at 27. A suitable pilot light and safety control means (not shown) is provided in conventional manner. It should be understood that other types of fuel or electric heating may also be used.

In the plenum 18 of furnace 11 is located a temperature sensing unit indicated generally at 31. Sensing unit 31 includes an NTC (negative temperature coefficient of resistivity) thermistor TH1 which comprises the actual temperature sensing means and a heater H1 which, when energized, applies a biasing heat flow to thermistor TH1. The response of thermistor TH1 to the plenum temperature can thus be varied or shifted by varying the energization of the heater H1. In FIG. 1 sensing unit 31 is illustrated not to scale but this unit may, in fact, comprise a very small package, e.g., on the order of 3/8 inch maximum dimension, comprising a small thermistor to which is cemented a heater. The heater may in fact also comprise a separate small mass of a semiconductor or thermistor material which produces heat by resistive dissipation when current is passed therethrough. It should be understood that, when the burner 13 is energized, there is a delay before the sensing unit 31 senses a change in temperature in the plenum.

The energization of the gas valve solenoid 27 is controlled in an on-off mode by a gas control circuit 35 which responds to variations in the resistance of thermistor TH1. The gas control circuit 35 is operative to selectively energize burner 13 to control deviations in the temperature of thermistor TH1 around a predetermined temperature threshold. Burner 13 is thus periodically energized and the frequency and durations of the periods of energization depend upon, among other parameters, the inherent differential in the response of gas control circuit 35 to changes in the resistance of thermistor TH1 and the delay between energization of the burner and the corresponding change in plenum temperature. It should be understood that the frequency of this periodical energization of burner 13 is typically many times greater than the frequency at which furnaces are normally energized by conventional central thermostats and thus the temperature in zone 21 tends to be affected only by the average level of energization of burner 13 rather than tending to follow the cyclical variations.

The temperature within zone 21 is sensed by a sensing unit indicated generally at 41. Sensing unit 41 may, for example, comprise a solid-state thermostat of the type disclosed in the copending application Ser. No. 653,469 of myself and Joseph W. Waseleski, Jr. entitled Thermostatic Apparatus, filed July 14, 1967. Thermostat 41 includes an NTC temperature sensing thermistor TH2 which is responsive to the temperature in zone 21 and a heater H2 which applies a biasing heat flow to thermistor TH2 as indicated by the arrows extending from heater H2 to thermistor TH2. The thermal coupling between heater H2 and thermistor TH2 is manually variable as indicated by the diagonal arrow crossing the heat flow arrows. As is disclosed in greater detail in the aforesaid copending application, the response of thermistor TH2 to the ambient temperature in zone 21 may be selectively varied by varying the thermal coupling between the heater and the temperature sensing thermistor. Heater H2 is preferably of a self-regulating type which maintains itself at a fixed predetermined temperature. This heater may, for example, comprise a mass of a semiconductor or thermistor material having a positive temperature coefficient which exhibits a transition temperature above which the resistance of the material rises relatively abruptly. When a voltage is applied across such a mass of material it will self heat to the transition temperature and then will maintain itself relatively precisely at that temperature since any further increase in temperature causes a reduction in the power resistively dissipated.

Thermistor TH2 controls a bias heat control circuit 43 which is operative to energize the heater H1 in the plenum temperature sensing unit 31 to an extent which varies as a function of the resistance of thermistor TH2. Accordingly, the biasing heat applied to the plenum thermistor TH1 is varied as a function of the temperature within the zone 21. As is explained in greater detail hereinafter this variation in the biasing heat applied to thermistor TH1 correspondingly varies the proportion of time during which the burner 13 is energized and thus also varies the average value of the heat flow into zone 21. The bias is applied in a sense tending to maintain the temperature in zone 21 at a preselected level, i.e., the bias provides negative feedback. Since the cyclical turning on and off of the burner 13 is controlled by the plenum temperature as sensed by TH1 rather than upon the temperature sensed by the zone thermistor TH2, it can be seen that this on-off mode of operation does not depend upon fluctuations in the temperature of zone 21 across any differential or deadband region as with typical prior art thermostats. Thus, for any given temperature in zone 21 there will be a corresponding average value of heat flow to the zone, which value is determined by the duty cycle of burner 13. Since it is this average value of heat flow to which the temperature in zone 21 responds, the control exercised is of the type conventionally referred to as proportional control.

The temperature control circuitry is illustrated in greater detail in FIG. 2. The operating winding of the gas valve solenoid 27 is indicated at W1. A.C. power for selectively energizing this winding and the control circuitry associated therewith is obtained from a suitable source through a pair of supply leads L1 and L2. The current is preferably supplied at a voltage level suitable for semiconductor circuitry, e.g., 24 volts A.C. Winding W1 is connected across leads L1 and L2 through the A.C. input terminals of a full wave rectifier bridge 51 comprising diodes D1–D4. A SCR (silicon controlled rectifier) Q1 is connected across the D.C. output terminals of rectifier bridge 51. As is understood by those skilled in the art, SCR Q1 is forward biased on both half cycles of the applied A.C. and thus, when the SCR conducts, full wave A.C. is applied to winding W1 thereby energizing solenoid 27 and opening valve 25. When the SCR does not conduct, full wave rectified pulsating D.C. appears across the anode-cathode circuit of the SCR and only a very low level of current flows through the winding W1, which current level is insufficient to operate valve 25.

A circuit for selectively triggering SCR Q1 is connected across its anode-cathode circuit. The pulsating D.C. available when the SCR is not conducting is applied, through a dropping resistor R1, to a Zener diode Z1 which thus provides a source of regulated and clipped D.C. Connected across this regulated D.C. source is a voltage divider 53 which comprises the plenum temperature sensing thermistor TH1 connected in series with a reference resistor R2. Resistor R2 is shunted by a capacitor C1.

This triggering circuit operates in the following manner. Assuming that the SCR Q1 is not conducting and that the plenum temperature is relatively high so that the NTC thermistor TH1 exhibits a low resistance, the voltage across thermistor TH1 will not be high enough to trigger SCR Q1. Thus the winding W1 will remain deenergized. If, however, the temperature of thermistor TH1 drops below a predetermined level, the voltage across the thermistor will rise to a level sufficiently high to trigger SCR Q1. When the SCR conducts, the operating winding of W1 of the valve solenoid is energized and the burner will be turned on thereby applying heat which tends to raise the plenum temperature. On the A.C. half cycle when the SCR Q1 is triggered, the voltage across its anode-cathode circuit drops to a very low level and thus capacitor C1 discharges. On the next half cycle, the SCR will again be forward biased due to the operation of the rectifier bridge 51 and the recharging of capacitor C1 tends to assist the triggering of the SCR. It can thus be seen that capacitor C1 provides a regenerative effect in the SCR triggering action. This regeneration in the SCR triggering circuit produces a differential in the response of the triggering circuit to changes in the resistance of thermistor TH1. There is thus a corresponding differential between the temperatures of thermistor TH1 at which the winding W1 is energized and deenergized. Due to this temperature differential and to the time lag in the response of thermistor TH1 to the energization of the burner 13 as noted previously, the burner 13 will be cyclically turned on and off to control deviations in the temperature of thermistor TH1 around the predetermined temperature level or threshold which corresponds to the resistance of thermistor TH1 which produces triggering of SCR Q1.

Heater H1 is connected in series with an SCR Q2 across the A.C. supply leads, L1 and L2 so as to provide to thermistor TH1 a biasing heat flow which can be varied by phase angle control of the SCR. A voltage divider comprising a pair of resistors R4 and R5 applies to one side of the zone temperature sensing thermistor TH2 an A.C. voltage of predetermined amplitude. The other side of thermistor TH2 is connected to lead L2 through a timing capacitor C2. The thermistor is shunted by a diode D5 and the junction between thermistor TH2 and capacitor C2 is connected to the gate electrode of SCR Q2 through a diode D6. Self-regulating heater H2 is connected directly across leads L1 and L2.

On those A.C. half cycles when lead L1 is negative with respect to lead L2, the junction between thermistor TH2 and capacitor C2 is charged to a predetermined negative voltage. Then, during those A.C. half cycles when lead L1 is positive with respect to lead L2, capacitor C2 is charged in the opposite direction through thermistor TH2 at a rate which varies as a function of the resistance of the thermistor, the charging current to the capacitor being in effect a signal the amplitude of which varies as a function of the temperature in zone 11. When the charge on capacitor C2 reaches a predetermined positive potential, diode D6 is forward biased and SCR Q2 is triggered. Thus, the time within the positive half cycle at which SCR2 is triggered will vary as a function of the resistance of thermistor TH2 and hence also as a function of the ambient temperature within zone 21. The earlier within the positive half cycle that SCR Q2 is triggered, the more power is applied to heater H1 and thus the biasing heat flow applied to thermistor TH1 also varies as a function of the ambient temperature within zone 21.

As noted previously, variations in the biasing heat flow applied to thermistor TH1 shift the response of that thermistor to the plenum temperature. A change in the biasing heat flow thus also affects the proportion of time during which the burner 13 is turned on by the gas control circuit 35 in maintaining the temperature of thermistor TH1 at its previously prescribed predetermined level. The average heat flow provided by furnace 11 to zone 21 is thus varied as a function of the temperature in the zone as sensed by thermistor TH2, the control being applied in a sense tending to maintain the temperature in the zone at a preselected level. Since the duty cycle or proportion of time during which the burner is energized varies substantially as a continuous or single valued function of the resistance of the zone temperature sensing thermistor TH2, it can be seen that a so-called proportional temperature control is obtained. Further, since the on-off or duty cycle modulation of the burner energization is controlled as a function of plenum temperature rather than ambient temperature, it can be seen that the modulation of average heat flow relative to the zone does not depend upon fluctuations in the ambient temperature and that a very steady and precise control is provided.

While a gas-fired, forced hot air heating system has been illustrated, it should be understood that the present invention may be applied to other types of heating systems, e.g., a system in which heat is applied to a different fluid such as water, and may also be applied to cooling or air conditioning system. In such cases, the temperature at which heat is provided to or taken from the controlled zone may be measured at a different point, e.g., in the water stream in the case of a hot water heating system, instead of in the plenum of the hot air system illustrated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for maintaining the temperature in a given zone at a preselected level, said apparatus comprising:

means including a hot air furnace having a plenum and a burner which, when energized, varies the plenum temperature thereby affecting heat flow relative to said zone, there being a delay between energization of said burner and the corresponding change in said plenum temperature;

a thermistor in said plenum responsive to the plenum temperature;

means controlled by said thermistor for energizing the burner when the temperature of said thermistor passes a predetermined threshold thereby to control deviations in the temperature of said thermistor around said threshold by on-off energization of the burner, said energizing means including an electrically operated valve for selectively passing fuel to the burner and a trigger circuit responsive to changes in the resistance of said thermistor for energizing the valve when the temperature of said thermistor passes said predetermined threshold, said circuit providing a differential between the thermistor resistance at which the valve is energized and the thermistor resistance at which the valve is deenergized;

temperature sensing means for providing a signal which varies as a function of the temperature in said zone; and means for providing a biasing heat flow relative to said thermistor which biasing heat flow varies as a function of said signal thereby to shift the temperature at which said thermistor responds to said plenum temperature whereby the proportion of time during which said burned is energized is varied to maintain the temperature in said zone at said preselected level.

2. Apparatus for maintaining the temperature in a given zone at a preselected level, said apparatus comprising:

means including a hot air furnace having a plenum and a burner which, when energized, varies the plenum temperature thereby affecting heat flow relative to said zone, there being a delay between energization of said burner and the corresponding change in said plenum temperature;

a thermistor in said plenum responsive to the plenum temperature;

means controlled by said thermistor for energizing the burner when the temperature of said thermistor passes a predetermined threshold thereby to control deviations in the temperature of said thermistor around said threshold by on-off energization of said burner, said energizing means including an electrically operated valve for selectively passing fuel to said burner and means responsive to the resistance of said thermistor for energizing the valve when the temperature of said thermistor passes said predetermined threshold;

temperature sensing means for providing a signal which varies as a function of the temperature in said zone; and means including an electric heater which is thermally coupled to said thermistor for providing a biasing heat flow relative to said thermistor which biasing heat flow varies as a function of said signal thereby to shift the temperature at which said thermistor responds to said plenum temperature whereby the proportion of time during which said burner is energized is varied to maintain the temperature in said zone at said preselected level.

3. Apparatus as set forth in claim 2 wherein said temperature sensing means comprises a second thermistor which is in said zone.

4. Apparatus as set forth in claim 3 including means responsive to the resistance of said second thermistor for energizing said heater to an extent which varies as a function of the temperature in said zone.

5. Apparatus as set forth in claim 4 wherein said means for energizing said heater includes means for providing A.C., a controlled rectifier for varying the flow of A.C. to said heater, and means for varying the phase angle of triggering of said controlled rectifier as a function of the resistance of said second thermistor.

6. Apparatus for maintaining the temperature in a given zone at a preselected level, said apparatus comprising:

means which, when energized, varies a first temperature which first temperature affects heat flow relative to said zone, there being a delay between energization of said means and the corresponding change in said first temperature;

a thermistor responsive to said first temperature;

circuit means controlled by said thermistor and responsive to the resistance of said thermistor for energizing said temperature varying means when the temperature of said thermistor passes a first level and for deenergizing said temperature varying means when the resistance of said thermistor passes a second level, there being a differential between said first and second levels whereby said temperature varying means is periodically energized to control deviations in the resistance of said thermistor between said levels;

temperature sensing means for providing a signal which varies as a function of the temperature in said zone; and means for providing a biasing heat flow relative to said thermistor which biasing heat flow varies as a function of said signal thereby to shift the temperature at which said thermistor responds to said first temperature whereby the proportion of time during which said temperature varying means is energized is varied to maintain the temperature in said zone at said preselected level.

7. Apparatus as set forth in claim 6 wherein said temperature sensing means comprises a second thermistor which is responsive to the temperature in said zone and wherein said means for providing a biasing heat flow comprises an electric heater thermally coupled to said first thermistor and means for energizing said heater to an extent which varies as a function of the resistance of said second thermistor.

8. Apparatus for maintaining the temperature in a given zone at a preselected level, said apparatus comprising:

a burner for applying heat to said zone;

an electrically operated valve which, when energized, supplies fuel to said burner;

a first temperature sensing thermistor responsive to the temperature at which said heat is provided, there being a delay between energization of said valve and the corresponding change in said temperature;

means responsive to the resistance of said first thermistor for energizing said valve when the temperature of said first thermistor passes a predetermined threshold thereby to control deviations in the temperature of said first thermistor around said threshold by on-off control of said burner;

a second temperature sensing thermistor responsive to the temperature in said zone;

an electric heater which is thermally coupled to said first thermistor; and means for energizing said heater as a function of the resistance of said second thermistor thereby to vary the proportion of time during which said burner is on to maintain the temperature in said zone at said preselected level.

9. Apparatus for maintaining the temperature in a given zone at a preselected level, said apparatus comprising:

means for providing a fluid flow for transporting heat to said zone;

heater means which, when energized, adds heat to said fluid for increasing the heat flow to said zone;

a first thermistor for responding to the temperature of said fluid;

control means responsive to the resistance of said first thermistor for energizing said heater means when the resistance of said first thermistor passes a first level and for deenergizing said heater means when the resistance of said first thermistor passes a second level, there being a differential between said first and second levels whereby said control means controls deviations in the temperature of said first thermistor by on-off energization of said heater means;

an electric bias heater which is thermally coupled to said first thermistor for applying a biasing heat thereto to vary the response of said first thermistor to the temperature of said fluid;

a second thermistor for responding to the temperature in said zone; and means responsive to the resistance of said second thermistor for energizing said bias heater to an extent which varies as a function of the temperature in said zone whereby the proportion of time during which said heater means is energized is varied to maintain the temperature in said zone at said preselected level.

References Cited

UNITED STATES PATENTS

| 2,509,334 | 5/1950 | Collins | 236—68 |
| 2,758,791 | 8/1956 | Jenkins | 236—9 |
| 2,789,767 | 4/1957 | Martinson. | |
| 3,358,922 | 12/1967 | Norton | 236—9 |

EDWARD J. MICHAEL, Primary Examiner

U.S. Cl. X.R.

236—68, 91